US012559057B2

(12) United States Patent
Takayama et al.

(10) Patent No.: US 12,559,057 B2
(45) Date of Patent: Feb. 24, 2026

(54) SYSTEMS AND METHODS FOR ADAPTIVELY ADJUSTING A SEAT BELT LOAD LIMITER

(71) Applicant: Toyota Motor Engineering & Manufacturing North America, Inc., Plano, TX (US)

(72) Inventors: Mizuho Takayama, Ann Arbor, MI (US); Yuyang Song, Ann Arbor, MI (US); Gurmeet Singh, Ann Arbor, MI (US); Phouvadol P. Khouphongsy, Saline, MI (US); Umesh Gandhi, Farmington Hills, MI (US); Koray Benli, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 18/435,213

(22) Filed: Feb. 7, 2024

(65) Prior Publication Data

US 2025/0249862 A1 Aug. 7, 2025

(51) Int. Cl.
*B60R 22/28* (2006.01)

(52) U.S. Cl.
CPC ........ *B60R 22/28* (2013.01); *B60R 2022/282* (2013.01)

(58) Field of Classification Search
CPC .......................... B60R 22/28; B60R 2022/282
See application file for complete search history.

(56) References Cited

U.S. PATENT DOCUMENTS

| | | | | |
|---|---|---|---|---|
| 6,481,659 B1 * | 11/2002 | Ashtiani | ............. | B60R 22/3413 |
| | | | | 280/805 |
| 6,655,743 B1 * | 12/2003 | Parizat | .................. | B60R 22/343 |
| | | | | 297/475 |
| 9,958,023 B2 | 5/2018 | Wetzel et al. | | |
| 2017/0203714 A1 * | 7/2017 | Schlaps | ............... | B60R 22/3413 |

FOREIGN PATENT DOCUMENTS

| | | | | |
|---|---|---|---|---|
| DE | 10204927 B4 | 4/2005 | | |
| DE | 102007041434 A1 * | 3/2008 | ............. | B60R 22/46 |
| WO | 2018142293 A1 | 8/2018 | | |
| WO | 2001051321 A1 | 7/2021 | | |

OTHER PUBLICATIONS

Machine Translation of DE 102007041434 A1 PDF File Name: "DE102007041434A1_Machine_Translation.pdf" (Year: 2008).*

* cited by examiner

*Primary Examiner* — Lindsay M Low
*Assistant Examiner* — Ruben Picon-Feliciano
(74) *Attorney, Agent, or Firm* — Christopher G. Darrow; Darrow Mustafa, PC

(57) ABSTRACT

Systems and methods described herein relate to adaptively adjusting the load limit of a seat belt load limiter. In one embodiment, an adaptive load-limit adjustment system estimates the weight of an occupant of a vehicle seat based on sensor data. The system also adjusts the load limit of the seat belt load limiter in accordance with the estimated weight of the occupant by causing one or more pins to protrude laterally a predetermined length from a torsional bar of the seat belt load limiter to change an effective diameter of the torsional bar and thereby adjust a shear force exerted during a vehicular crash on a STF that surrounds the torsional bar between the torsional bar and a housing of the seat belt load limiter.

20 Claims, 7 Drawing Sheets

Pretensioner

Load Limiter

Multi-Selectable

Multi-Stage

SYSTEMS AND METHODS FOR ADAPTIVELY ADJUSTING A SEAT BELT LOAD LIMITER

TECHNICAL FIELD

The subject matter described herein relates in general to vehicle seat belt systems and, more specifically, to systems and methods for adaptively adjusting a seat belt load limiter.

BACKGROUND

Chest injury is one of the greatest potential risks vehicle occupants face in a frontal collision. Such injury is caused by the seat belt worn by the occupant exerting excessive force against the occupant's chest, resulting in bruising and damage to internal organs and bones (e.g., sternum and rib fractures). Many current seat-belt systems include a pretensioner that quickly retracts some of the seat-belt webbing in the event of an imminent frontal collision (e.g., in response to the driver suddenly pressing hard on the brake pedal or a sudden decrease in speed due to a detected collision). This rapid retraction (e.g., under motorized control) of the seat-belt webbing forces the occupant's back firmly against the seat as the collision occurs. Many current seat belt systems also include a load limiter that limits (reduces) the force exerted on an occupant's chest during a frontal collision. Such a load limiter, which is activated in response to the occupant's body accelerating forward upon impact after the pretensioner has engaged as described above, releases additional seat belt webbing so the occupant's head and torso are permitted to move forward somewhat toward the deploying airbag, thereby reducing the force on the occupant's chest. One commercially available load limiter is designed to limit the force exerted on a mid-size male's chest to 4 kN and the force exerted on a small female's chest to 3 kN.

SUMMARY

Embodiments of a system for adaptively adjusting a seat belt load limiter are presented herein. In one embodiment, the system comprises a processor and a memory storing machine-readable instructions that, when executed by the processor, cause the processor to estimate the weight of an occupant of a vehicle seat based on sensor data. The memory also stores machine-readable instructions that, when executed by the processor, cause the processor to adjust the load limit of the seat belt load limiter in accordance with the estimated weight of the occupant by causing one or more pins to protrude laterally a predetermined length from a torsional bar of the seat belt load limiter to change an effective diameter of the torsional bar and thereby adjust a shear force exerted during a vehicular crash on a shear-thickening fluid (STF) that surrounds the torsional bar between the torsional bar and a housing of the seat belt load limiter.

Another embodiment is a non-transitory computer-readable medium for adaptively adjusting a seat belt load limiter and storing instructions that, when executed by a processor, cause the processor to estimate the weight of an occupant of a vehicle seat based on sensor data. The instructions also cause the processor to adjust the load limit of the seat belt load limiter in accordance with the estimated weight of the occupant by causing one or more pins to protrude laterally a predetermined length from a torsional bar of the seat belt load limiter to change an effective diameter of the torsional bar and thereby adjust a shear force exerted during a vehicular crash on a STF that surrounds the torsional bar between the torsional bar and a housing of the seat belt load limiter.

Another embodiment is a method of adaptively adjusting a seat belt load limiter, the method comprising estimating the weight of an occupant of a vehicle seat based on sensor data. The method also includes adjusting the load limit of the seat belt load limiter in accordance with the estimated weight of the occupant by causing one or more pins to protrude laterally a predetermined length from a torsional bar of the seat belt load limiter to change an effective diameter of the torsional bar and thereby adjust a shear force exerted during a vehicular crash on a STF that surrounds the torsional bar between the torsional bar and a housing of the seat belt load limiter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
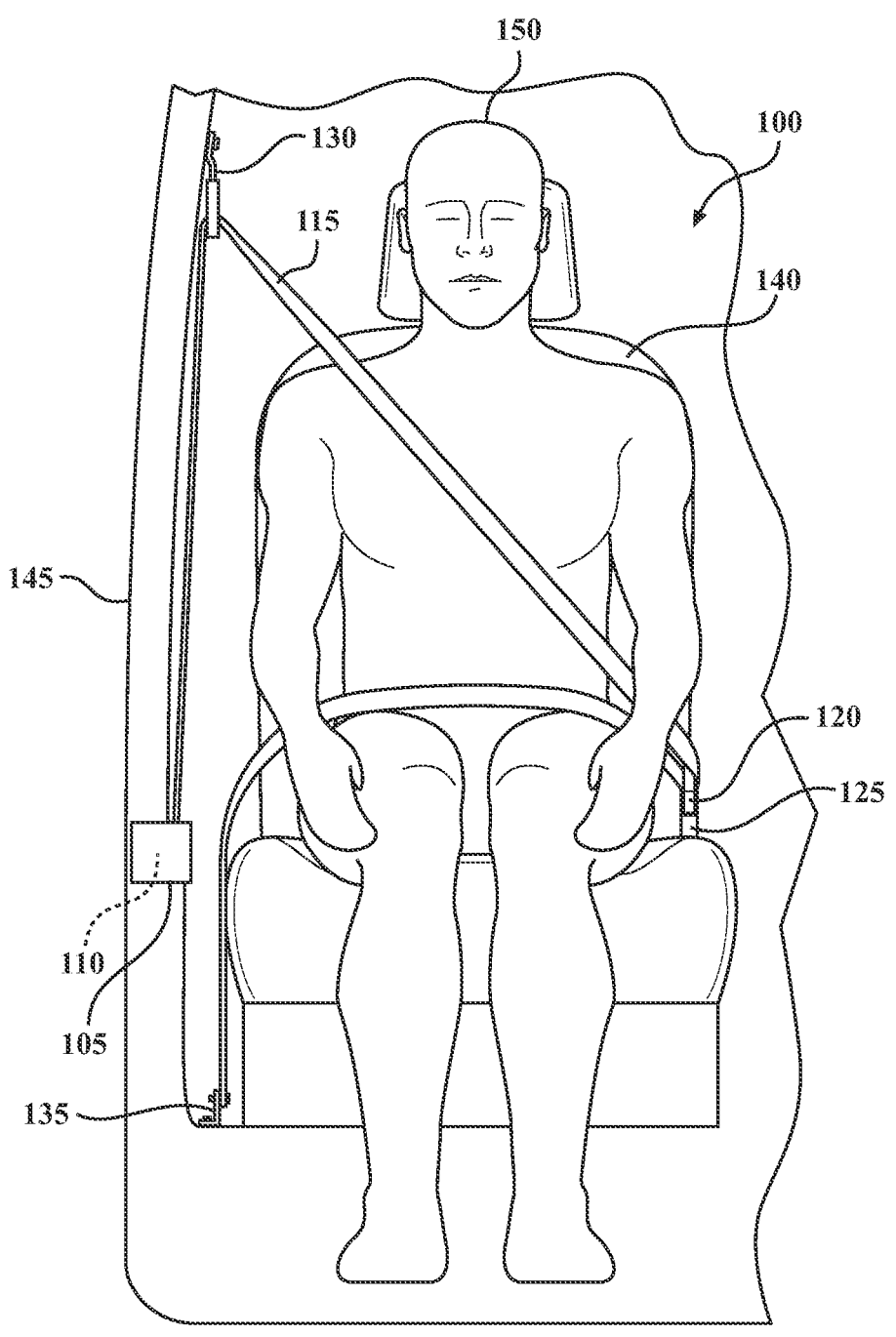
FIG. 1 is an illustration of a vehicle seat belt system in which various embodiments of systems and methods for adaptively adjusting a seat belt load limiter can be implemented.

Various embodiments described herein of systems and methods for adaptively adjusting a seat belt load limiter (hereinafter sometimes referred to simply as a "load limiter") adapt the load limiter to protect any vehicle occupant rather than being limited to protecting a mid-size male (4-kN load limit) or a small female (3-kN load limit). Moreover, the various embodiments described herein provide this adaptability through use of a shear-thickening fluid (STF), a type of rate-responsive material, that surrounds a torsional bar of the load limiter. In the various embodiments described herein, the load limiter is implemented as a feature of the seat belt system's retractor.

In various embodiments, an adaptive load-limit adjustment system estimates the weight of an occupant of a vehicle seat based on sensor data. The system automatically adjusts the load limit (force limit) of the load limiter in accordance with the estimated weight of the occupant to adapt the load limiter to protect that specific occupant. As explained further below, the load limit is a force threshold beyond which the load limiter is activated to reduce pressure on the occupant's chest during a vehicular crash (e.g., a frontal collision). The system adjusts the load limit by causing one or more pins to protrude laterally a predetermined length from the torsional bar of the seat belt load limiter to change the effective diameter of the torsional bar. Changing the effective diameter of the torsional bar adjusts the shear force exerted during a vehicular crash on the STF that surrounds the torsional bar between the outer surface of the torsional bar and the inner surface of the housing of the load limiter. The variable viscosity of the STF in response to different levels of shear force enables the load limiter to have an adaptive (adjustable) load limit that is tailored for the present seat occupant based on the occupant's estimated weight. In some embodiments, the system adjusts the length of the pins by actuating one or more electromechanical components in the load limiter.

In some embodiments of an adaptive load-limit adjustment system described herein, the load limiter exhibits a multi-selectable force characteristic. In other embodiments, the load limiter exhibits a multi-stage force characteristic.

In some embodiments, the torsional bar of the load limiter has a circular cross-section. In other words, the torsional bar is cylindrical in shape. In other embodiments, the torsional bar can have a different cross-sectional shape, such as square or triangular. The shape of the torsional bar can affect the shear force exerted on the STF and thus affect the resulting load limit of the load limiter. In some embodiments, these geometric properties are incorporated in the design of the load limiter.

The adaptive techniques described herein based on occupant weight estimation and the variable viscosity of a STF can be applied to 3-point, 4-point, or 5-point seat belt systems. A 3-point seat belt system is widely used in cars and trucks. As those skilled in the art are aware, a 4-point or 5-point seat belt system can include two retractors, one on either side of the seat occupant. Such seat belt systems are commonly deployed for flight attendants (4-point) and pilots (5-point) in an aircraft.

FIG. 1 is an illustration of a vehicle seat belt system 100 in which various embodiments of systems and methods for adaptively adjusting a seat belt load limiter can be implemented. As shown in FIG. 1, vehicle seat belt system 100 is a 3-point system that includes a retractor 105, a pretensioner 110, webbing 115, a tongue plate 120, a buckle 125, a shoulder anchor 130, and an anchor 135. FIG. 1 also illustrates a vehicle seat 140, a center pillar 145 of a vehicle, and a human occupant 150 occupying the vehicle seat 140. Retractor 105 includes a load limiter in accordance with various embodiments described herein. Though not shown in FIG. 1, vehicle seat belt system 100 also includes an adaptive load-limit adjustment system that automatically adjusts the load limit of the load limiter based on the estimated weight of the occupant 150. This system is discussed in greater detail below.

Figure 2A:
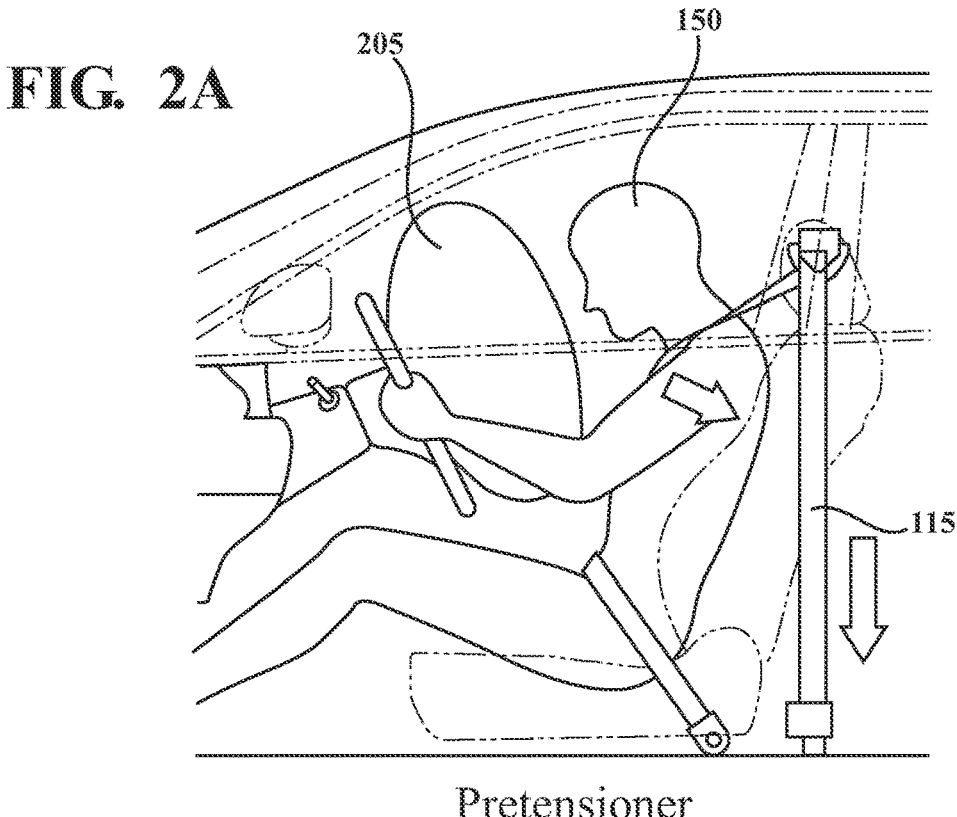
FIGS. 2A and 2B illustrate the operation, during a vehicular crash, of a seat belt pretensioner and a seat belt load limiter that is part of a retractor, in accordance with an illustrative embodiment of the invention.
Figure 2B:
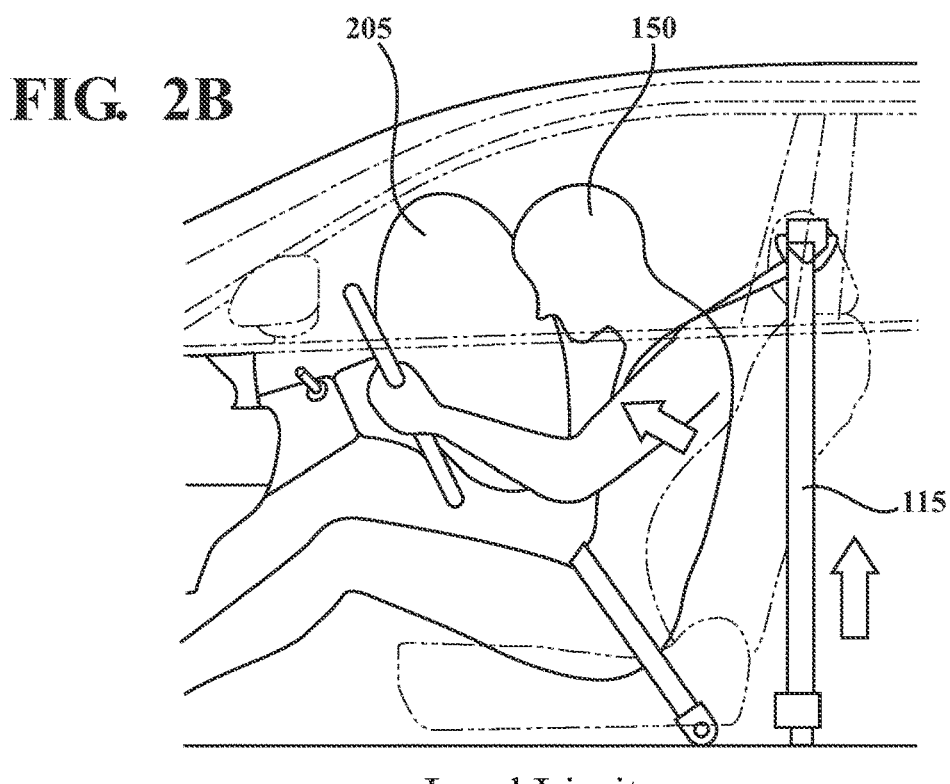

FIGS. 2A and 2B illustrate the operation, during a vehicular crash such as a frontal collision, of a seat belt pretensioner 110 and a seat belt load limiter that is part of a retractor 105, in accordance with an illustrative embodiment of the invention. As discussed above, when the vehicle's safety systems determine that a frontal collision is imminent (e.g., because the driver has suddenly pressed hard on the brake pedal or because the vehicle's sensors detect conditions that will result in such a collision), the safety systems activate pretensioner 110, which rapidly retracts some of the webbing 115 to ensure that the occupant's back is firmly against the seat back as the collision occurs. This is illustrated in FIG. 2A.

Prior to the detection of the imminent collision, an adaptive load-limit adjustment system in the vehicle has already adjusted the load limit (force threshold for activation) of the load limiter in accordance with the estimated weight of the occupant 150. As those skilled in the art are aware, the forward acceleration that an occupant 150 experiences during a given frontal collision is independent of the weight of occupant 150. However, the force exerted against the occupant's chest by the seat-belt webbing 115 is the product of the occupant's mass and the forward acceleration (f=ma). Thus, the force exerted on the webbing 115 of the seat belt system 100 (and, reciprocally, against the occupant's chest) depends on the mass of the occupant 150. To ensure that the occupant's chest is not subjected to excessive force by the seat-belt webbing 115, the load limit that controls activation of the load limiter is set to a predetermined value. As illustrated in FIG. 2B, once the force on the occupant's chest from webbing 115 has reached the predetermined load limit set by the adaptive load-limit adjustment system, the load limiter permits some additional webbing 115 to be released from the retractor 105 to reduce the force exerted on the occupant's chest (i.e., to prevent the force from increasing beyond the load limit). The release of the additional webbing 115 permits the head and torso of occupant 150 to move forward somewhat toward the deploying airbag 205, as illustrated in FIG. 2B.

Figure 3A:
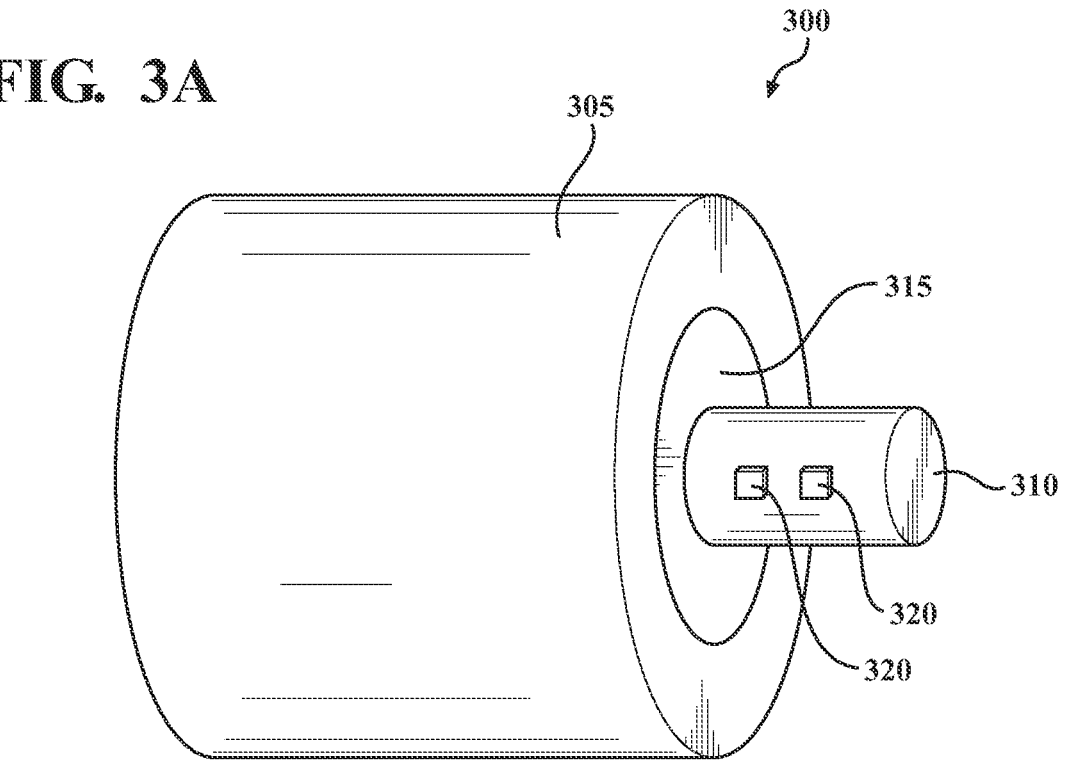
FIGS. 3A and 3B are illustrations of a seat belt load limiter, in accordance with an illustrative embodiment of the invention.
Figure 3B:
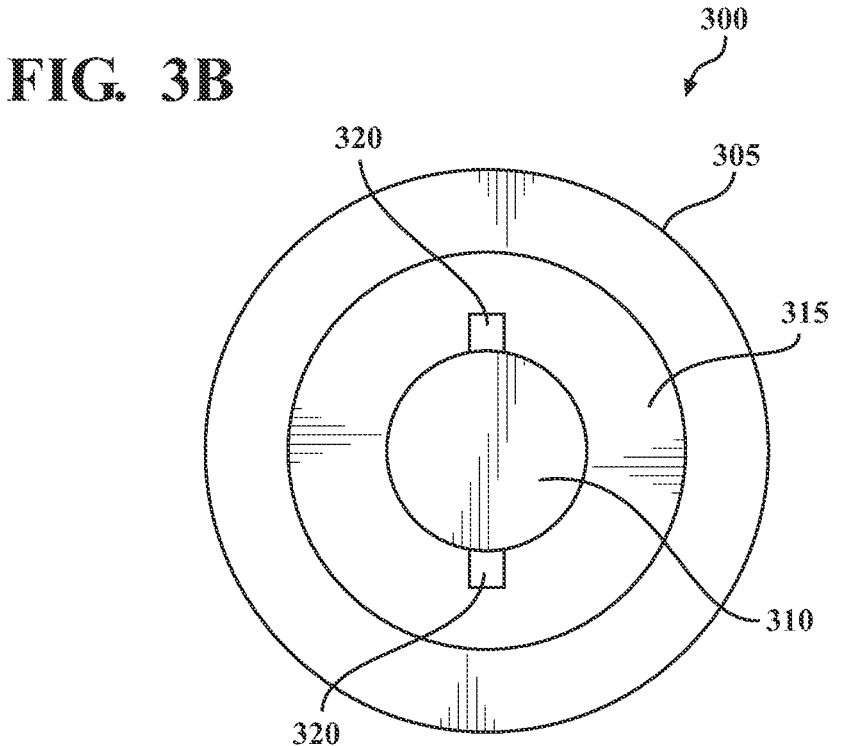

FIGS. 3A and 3B are illustrations of a seat belt load limiter 300, in accordance with an illustrative embodiment of the invention. FIG. 3A is a perspective and partially cutaway view, and FIG. 3B is an orthogonal and partially cutaway view of an end of load limiter 300. As discussed above, load limiter 300 is an integral part of the design of retractor 105. As those skilled in the art are aware, a retractor includes a spool around which extra webbing 115 (not shown in FIGS. 3A and 3B) is wound. In the embodiment of FIGS. 3A and 3B, load limiter 300 includes a housing 305 inside of which a torsional bar 310 is concentrically disposed. A layer or region of STF 315 surrounds the torsional bar 310 between the outer surface of torsional bar 310 and the inner surface of housing 305. As shown in FIGS. 3A and 3B, torsional bar 310 includes one or more pins 320 that extend laterally from torsional bar 310 into the surrounding STF 315. The pins 320 are able to move so that they can extend an adjustable, controllable length (the "extended length") from the surface of the torsional bar 310. The extended length of the pins 320 controls the degree to which the pins 320 impinge on (impact) the STF 315, thereby controlling the shear force exerted on the STF 315 in the event of a vehicular crash.

One of the important benefits of STF 315 is its ability to respond with varying viscosity (resistance force) depending on the energy/speed exerted by different occupants 150, depending on their mass. As explained above, a larger, more massive occupant 150 exerts greater force against the seat belt (and, reciprocally, is subjected to greater force in return) during a collision than a less massive occupant 150. The STF 315 can respond to the higher energy level of a more massive occupant 150 with a corresponding increase in viscosity. This response provides a stronger resistance force to halt the seat belt's movement, effectively enhancing occupant restraint in critical situations. The inclusion of STF 315 in the embodiments described herein can reduce reliance on traditional sensors and adaptive adjustment mechanisms while and also improving safety.

With respect to its effect on and interaction with the STF 315, adjusting the extended length of the pins 320 changes the effective diameter of the torsional bar 310. Increasing the effective diameter of the torsional bar 310 increases the load limit of the load limiter 300. Conversely, decreasing the effective diameter of the torsional bar 310 decreases the load limit of the load limiter 300.

In some embodiments, the extended length of the pins 320 is adjusted under electromechanical control by an adaptive load-limit adjustment system. For example, a combination of springs and electromagnets manipulated by a processor or microcontroller executing program instructions can be used to adjust the extended length of pins 320.

As those skilled in the art are aware, STF 315 is a rate-responsive material, a dilatant fluid comprising colloidally suspended solid particles in a liquid matrix. STF 315 exhibits increasing viscosity with increasing shear rate.

In the embodiment of FIGS. 3A and 3B, torsional bar 310 is cylindrical in shape (circular in cross-section). As mentioned above, in some embodiments, torsional bar 310 has a different geometric shape (e.g., square or triangular in cross-section). The geometric shape of the torsional bar 310 can also affect the shear force exerted on the STF 315 during a vehicular crash. The properties of various geometric shapes and their effects on the load limit can be taken into account during the design of the load limiter. Another variable that can be adjusted to achieve the desired range of load limits is the density of the solid particles in the STF 315.

Figures 4A, 4B:
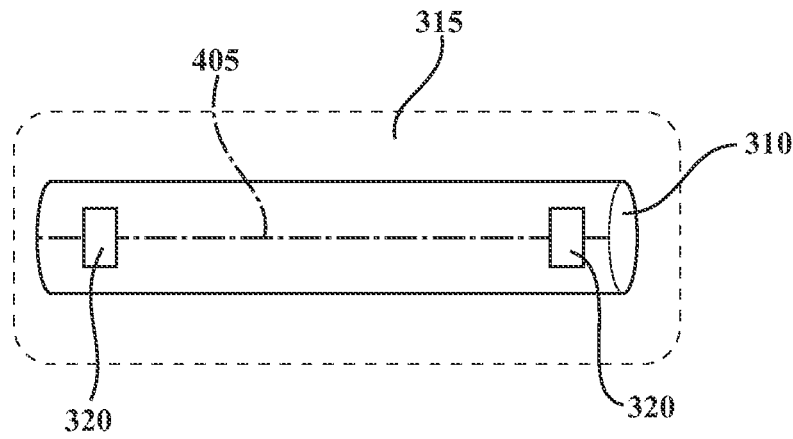
FIGS. 4A and 4B are diagrams of a torsional bar of a seat belt load limiter, in accordance with an illustrative embodiment of the invention.

FIGS. 4A and 4B are diagrams of a torsional bar 310 of a seat belt load limiter 300, in accordance with an illustrative embodiment of the invention. FIG. 4A depicts torsional bar 310 prior to a frontal collision, and FIG. 4B depicts torsional bar 310 during a frontal collision. During a frontal collision and after engagement of the pretensioner 110, force is exerted on torsional bar 310 by the webbing 115 that is wound around retractor 105. When the force reaches the predetermined load limit (force threshold) discussed above, torsional bar 310 begins to twist, as indicated by the displaced reference line 405 in FIGS. 4A and 4B. This twisting of torsional bar 310 releases some additional webbing 115 from retractor 105, as discussed above. As also discussed above, the extended length of pins 320 setting the effective diameter of torsional bar 310 and the variable viscosity of STF 315 make the load limit adaptively adjustable in accordance with the estimated weight of the occupant 150.

Figure 5A:
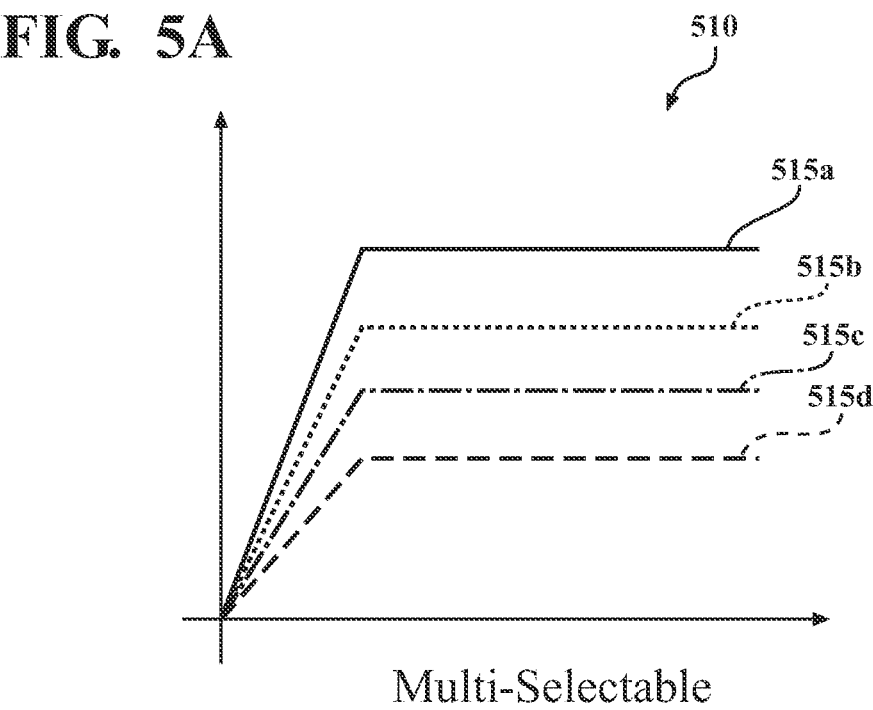
FIG. 5A is a plot of a multi-selectable force characteristic of a seat belt load limiter, in accordance with an illustrative embodiment of the invention.

FIG. 5A is a plot of a multi-selectable force characteristic 510 of a seat belt load limiter 300, in accordance with an illustrative embodiment of the invention. In FIG. 5A, the horizontal axis is time, and the vertical axis is force. In some embodiments, the adjustability of the extended length of the pins 320 enables the adaptive load-limit adjustment system to set the load limit of the load limiter to one of a plurality of predetermined values in a multi-selectable force characteristic of the load limiter, such as multi-selectable force characteristic 510. Multi-selectable force characteristic 510 includes a plurality of different load limits, including, for illustration, load limits 515*a*, 515*b*, 515*c*, and 515*d*.

Figure 5B:
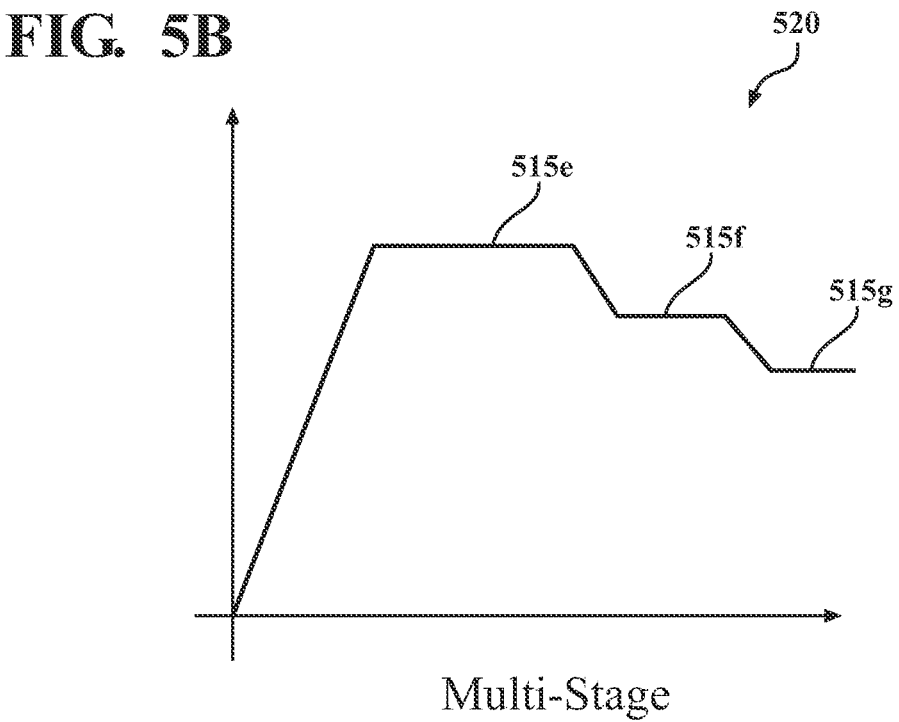
FIG. 5B is a plot of a multi-stage force characteristic of a seat belt load limiter, in accordance with an illustrative embodiment of the invention.

FIG. 5B is a plot of a multi-stage force characteristic 520 of a seat belt load limiter, in accordance with an illustrative embodiment of the invention. In FIG. 5B, the horizontal axis is again time, and the vertical axis is force. In some embodiments, the temporally variable viscosity properties of STF 315 in response to a sustained shear force cause the load limiter to exhibit a multi-stage force characteristic, such as multi-stage force characteristic 520. Multi-stage force characteristic 520 includes varying load limits (levels of resistive force) 515*e*, 515*f*, and 515*g* over time during a vehicular crash.

Figure 6:
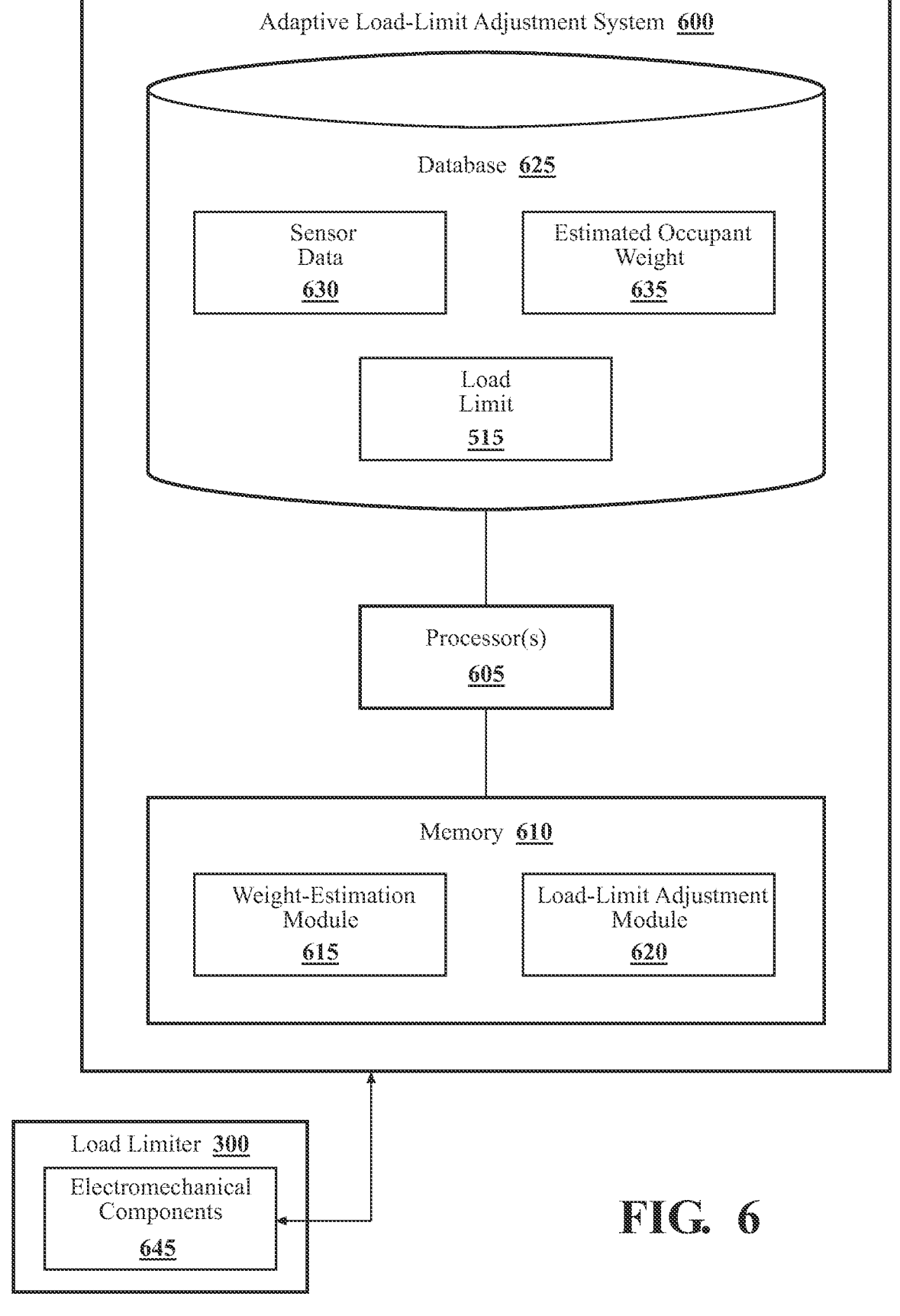
FIG. 6 is a block diagram of an adaptive load-limit adjustment system, in accordance with an illustrative embodiment of the invention.

FIG. 6 is a block diagram of an adaptive load-limit adjustment system 600, in accordance with an illustrative embodiment of the invention. In FIG. 6, adaptive load-limit adjustment system 600 includes one or more processors 605 to which a memory 610 is communicably coupled. The one or more processors 605 can be one or more dedicated processors, or the one or more processors 605 can coincide with one or more processors in the host vehicle that are used for other purposes (e.g., the vehicle's Electronic Control Unit). Memory 610 stores a weight-estimation module 615 and a load-limit adjustment module 620. The memory 610 is a random-access memory (RAM), read-only memory (ROM), a hard-disk drive, a flash memory, or other suitable non-transitory memory for storing the modules 615 and 620. The modules 615 and 620 are, for example, machine-readable instructions that, when executed by the one or more processors 605, cause the one or more processors 605 to perform the various functions disclosed herein.

As shown in FIG. 6, adaptive load-limit adjustment system 600 communicates with a load limiter 300, which is an aspect of the design of a retractor 105 of a vehicle seat belt system 100. Specifically, adaptive load-limit adjustment system 600 interfaces with electromechanical components 645 that adjust the extended length of the pins 320 in load limiter 300 to set the load limit of the load limiter in accordance with the estimated weight of an occupant 150, as discussed above.

As also shown in FIG. 6, depth and scale training system 120 can store various kinds of data in a database 625. For example, adaptive load-limit adjustment system 600 can store sensor data 630 used to estimate the weight of an occupant 150, estimated occupant weight 635, and the selected load limit 515 of load limiter 300.

Weight-estimation module 615 generally includes instructions that, when executed by the one or more processors 605, cause the one or more processors 605 to estimate the weight of an occupant 150 of a vehicle seat 140 based on sensor data 630. How weight-estimation module 615 estimates the weight of the occupant 150 varies, depending on the embodiment. In some embodiments, vehicle seat 140 includes a weight sensor that provides a direct estimate of the occupant's weight. In other embodiments, vehicle seat 140 includes a seat-sliding sensor that senses how far forward or back the vehicle seat 140 is positioned within its adjustable range. The position of the vehicle seat 140 relative to the dashboard or other fixed reference within the vehicle is an indicator of how tall the occupant 150 is. The height of the occupant 150 is at least one factor that supports estimating the occupant's weight. In other embodiments, weight-estimation module 615 analyzes sensor data 630 from visual sensors (e.g., one or more cameras within the passenger compartment of the vehicle) or ultrasonic sensors to estimate the occupant's size and weight. In these embodiments, a trained machine-learning-based model can be used to estimate the occupant's weight based on the sensor data 630.

Load-limit adjustment module 620 generally includes instructions that, when executed by the one or more processors 605, cause the one or more processors 605 to adjust the load limit 515 of the load limiter 300 in accordance with the estimated weight 635 of the occupant 150 by causing one or more pins 320 to protrude laterally a predetermined length from the torsional bar 310 of the load limiter 300 to change the effective diameter of the torsional bar 310 and thereby adjust the shear force exerted during a vehicular crash on the STF 315 surrounding the torsional bar 310. The adjustment of the extended length of the pins 320 is discussed in greater detail above in connection with FIGS. 3A and 3B. In one embodiment, various possible weights of an occupant 150 and the corresponding extended length of the pins 320 for each weight that provides the desired load limit 515 for a person of that weight is stored in a lookup table (e.g., in database 625). In this embodiment, when load-limit adjustment module 620 receives the estimated weight 635 of an occupant 150 from weight-estimation module 615, load-limit adjustment module 620 consults the lookup table to determine how to adjust the extended length of the pins 320 to achieve the target load limit 515 for the occupant 150 based on the occupant's estimated weight.

Figure 7:
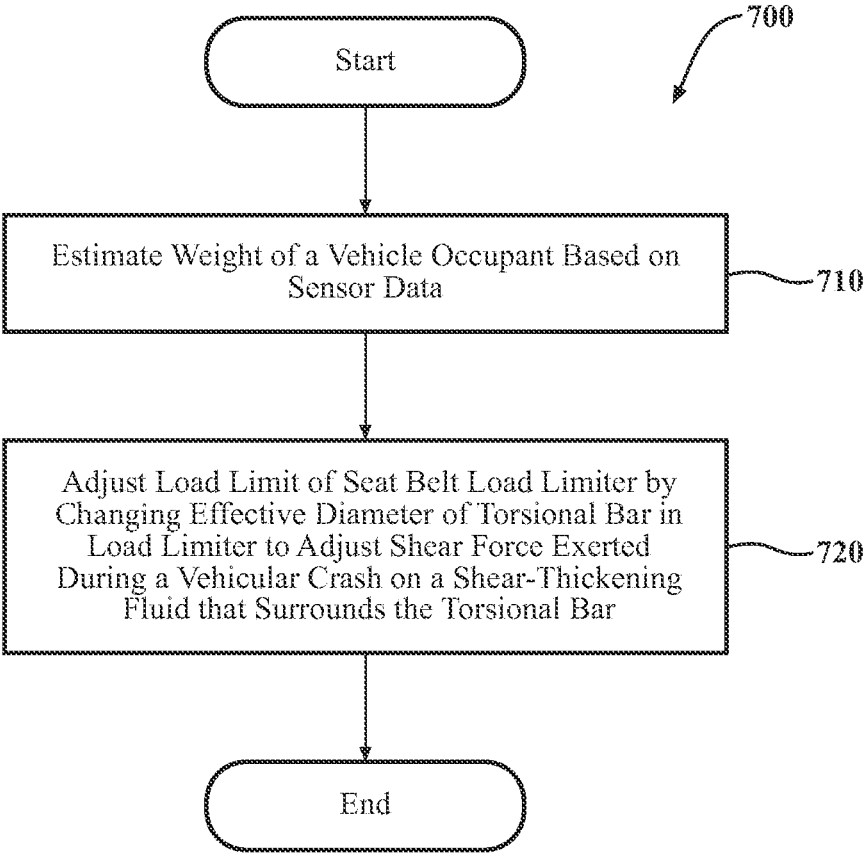
FIG. 7 is a flowchart of a method of adaptively adjusting a seat belt load limiter, in accordance with an illustrative embodiment of the invention.

FIG. 7 is a flowchart of a method 700 of adaptively adjusting a seat belt load limiter 300, in accordance with an illustrative embodiment of the invention. Method 700 will be discussed from the perspective of adaptive load-limit adjustment system 600 in FIG. 6. While method 700 is discussed in combination with adaptive load-limit adjustment system 600, it should be appreciated that method 700 is not limited to being implemented within adaptive load-limit adjustment system 600, but adaptive load-limit adjustment system 600 is instead one example of a system that may implement method 700.

At block 710, weight-estimation module 615 estimates the weight of an occupant 150 of a vehicle seat 140 based on sensor data 630. As discussed above, how weight-estimation module 615 estimates the weight of the occupant 150 varies, depending on the embodiment. In some embodiments, vehicle seat 140 includes a weight sensor that provides a direct estimate of the occupant's weight. In other embodiments, vehicle seat 140 includes a seat-sliding sensor that senses how far forward or back the vehicle seat 140 is positioned within its adjustable range. The position of the vehicle seat 140 relative to the dashboard or other fixed reference within the vehicle is an indicator of how tall the occupant 150 is. The height of the occupant 150 is at least one factor that supports estimating the occupant's weight. In other embodiments, weight-estimation module 615 analyzes sensor data 630 from visual sensors (e.g., one or more cameras within the passenger compartment of the vehicle) or ultrasonic sensors to estimate the occupant's size and weight. In these embodiments, a trained machine-learning-based model can be used to estimate the occupant's weight based on the sensor data 630.

At block 720, load-limit adjustment module 620 adjusts the load limit 515 of the load limiter 300 in accordance with the estimated weight 635 of the occupant 150 by causing one or more pins 320 to protrude laterally a predetermined length from the torsional bar 310 of the load limiter 300 to change the effective diameter of the torsional bar 310 and thereby adjust the shear force exerted during a vehicular crash on the STF 315 surrounding the torsional bar 310. The adjustment of the extended length of the pins 320 is discussed in greater detail above in connection with FIGS. 3A and 3B. As discussed above, in one embodiment, various possible weights of an occupant 150 and the corresponding extended length of the pins 320 for each weight that provides the desired load limit 515 for a person of that weight is stored in a lookup table (e.g., in database 625). In this embodiment, when load-limit adjustment module 620 receives the estimated weight 635 of an occupant 150 from weight-estimation module 615, load-limit adjustment module 620 consults the lookup table to determine how to adjust the extended length of the pins 320 to achieve the target load limit 515 for the occupant 150 based on the occupant's estimated weight.

As discussed above, the adaptive techniques described herein based on occupant weight estimation and the variable viscosity of a STF can be applied to 3-point, 4-point, or 5-point seat belt systems. A 3-point seat belt system is widely used in cars and trucks. As those skilled in the art are aware, a 4-point or 5-point seat belt system can include two retractors, one on either side of the seat occupant. Such seat belt systems are commonly deployed for flight attendants (4-point) and pilots (5-point) in an aircraft.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." As used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof.

Accordingly, reference should be made to the following claims rather than to the foregoing specification, as indicating the scope hereof.

What is claimed is:

1. A system for adaptively adjusting a seat belt load limiter, the system comprising:
   a processor; and
   a memory storing machine-readable instructions that, when executed by the processor, cause the processor to:
      estimate the weight of an occupant of a vehicle seat based on sensor data; and
      adjust a load limit of the seat belt load limiter in accordance with the estimated weight of the occupant by causing one or more pins to protrude laterally a predetermined length from a torsional bar of the seat belt load limiter to change an effective diameter of the torsional bar and adjust a shear force exerted during a vehicular crash on a shear-thickening fluid (STF) that surrounds the torsional bar between the torsional bar and a housing of the seat belt load limiter.

2. The system of claim 1, wherein the machine-readable instructions that, when executed by the processor, cause the one or more pins to protrude laterally the predetermined length from the torsional bar set the load limit to one of a plurality of predetermined values in a multi-selectable force characteristic of the seat belt load limiter.

3. The system of claim 1, wherein temporal viscosity properties of the STF in response to the shear force cause the seat belt load limiter to exhibit a multi-stage force characteristic.

4. The system of claim 1, wherein the torsional bar has one of a circular, square, and triangular cross-section.

5. The system of claim 1, wherein the machine-readable instructions that, when executed by the processor, cause the one or more pins to protrude laterally the predetermined length from the torsional bar actuate one or more electro-mechanical components in the seat belt load limiter.

6. The system of claim 1, wherein the load limit is a force threshold beyond which the seat belt load limiter is activated to reduce pressure on the chest of the occupant during the vehicular crash.

7. The system of claim 1, wherein the seat belt load limiter is part of one of a 3-point seat belt system, a 4-point seat belt system, and a 5-point seat-belt system.

8. A non-transitory computer-readable medium for adaptively adjusting a seat belt load limiter and storing instructions that, when executed by a processor, cause the processor to:
   estimate the weight of an occupant of a vehicle seat based on sensor data; and
   adjust a load limit of the seat belt load limiter in accordance with the estimated weight of the occupant by causing one or more pins to protrude laterally a predetermined length from a torsional bar of the seat belt load limiter to change an effective diameter of the torsional bar and adjust a shear force exerted during a vehicular crash on a shear-thickening fluid (STF) that surrounds the torsional bar between the torsional bar and a housing of the seat belt load limiter.

9. The non-transitory computer-readable medium of claim 8, wherein the instructions that, when executed by the processor, cause the one or more pins to protrude laterally the predetermined length from the torsional bar set the load limit to one of a plurality of predetermined values in a multi-selectable force characteristic of the seat belt load limiter.

10. The non-transitory computer-readable medium of claim 8, wherein temporal viscosity properties of the STF in response to the shear force cause the seat belt load limiter to exhibit a multi-stage force characteristic.

11. The non-transitory computer-readable medium of claim 8, wherein the torsional bar has one of a circular, square, and triangular cross-section.

12. The non-transitory computer-readable medium of claim 8, wherein the instructions that, when executed by the processor, cause the one or more pins to protrude laterally the predetermined length from the torsional bar actuate one or more electromechanical components in the seat belt load limiter.

13. The non-transitory computer-readable medium of claim 8, wherein the load limit is a force threshold beyond which the seat belt load limiter is activated to reduce pressure on the chest of the occupant during the vehicular crash.

14. A method, comprising:
  estimating the weight of an occupant of a vehicle seat based on sensor data; and
  adjusting a load limit of a seat belt load limiter in accordance with the estimated weight of the occupant by causing one or more pins to protrude laterally a predetermined length from a torsional bar of the seat belt load limiter to change an effective diameter of the torsional bar and adjust a shear force exerted during a vehicular crash on a shear-thickening fluid (STF) that surrounds the torsional bar between the torsional bar and a housing of the seat belt load limiter.

15. The method of claim 14, wherein causing the one or more pins to protrude laterally the predetermined length from the torsional bar sets the load limit to one of a plurality of predetermined values in a multi-selectable force characteristic of the seat belt load limiter.

16. The method of claim 14, wherein temporal viscosity properties of the STF in response to the shear force cause the seat belt load limiter to exhibit a multi-stage force characteristic.

17. The method of claim 14, wherein the torsional bar has one of a circular, square, and triangular cross-section.

18. The method of claim 14, wherein the one or more pins are caused to protrude laterally the predetermined length from the torsional bar under electromechanical control.

19. The method of claim 14, wherein the load limit is a force threshold beyond which the seat belt load limiter is activated to reduce pressure on the chest of the occupant during the vehicular crash.

20. The method of claim 14, wherein the seat belt load limiter is part of one of a 3-point seat belt system, a 4-point seat belt system, and a 5-point seat-belt system.

\* \* \* \* \*